(12) United States Patent
Hall et al.

(10) Patent No.: US 11,441,315 B2
(45) Date of Patent: Sep. 13, 2022

(54) SYSTEM FOR HEATING AND COOLING A ROOM WITH INSULATING LAYER

(71) Applicant: Hall Labs LLC, Provo, UT (US)

(72) Inventors: David R Hall, Provo, UT (US); Arjun Krishna, Orem, UT (US); Jeremy Johnson, Salem, UT (US)

(73) Assignee: Hall Labs LLC, Provo, UT (US)

(*) Notice: Subject to any disclaimer, the term of this patent is extended or adjusted under 35 U.S.C. 154(b) by 360 days.

(21) Appl. No.: 16/424,456

(22) Filed: May 28, 2019

(65) Prior Publication Data
US 2020/0378118 A1 Dec. 3, 2020

(51) Int. Cl.
| | |
|---|---|
| F16L 59/065 | (2006.01) |
| E04C 2/20 | (2006.01) |
| E04C 2/52 | (2006.01) |
| F24D 3/12 | (2006.01) |
| F24F 5/00 | (2006.01) |
| F24D 3/18 | (2006.01) |
| F24D 3/14 | (2006.01) |

(52) U.S. Cl.
CPC ............... *E04C 2/525* (2013.01); *E04C 2/20* (2013.01); *F16L 59/065* (2013.01); *F24D 3/12* (2013.01); *F24D 3/122* (2013.01); *F24D 3/14* (2013.01); *F24D 3/18* (2013.01); *F24F 5/0089* (2013.01); *F24F 2221/10* (2013.01); *F24F 2221/17* (2013.01)

(58) Field of Classification Search
CPC E04C 2/525; E04C 2/20; F16L 59/065; F24F 5/0089; F24F 2221/17; F24F 2221/10; F24D 3/12; F24D 3/122; F24D 3/14; F24D 3/18

USPC .......................................... 165/49, 148, 149
See application file for complete search history.

(56) References Cited

U.S. PATENT DOCUMENTS

| | | | | |
|---|---|---|---|---|
| 6,094,922 A * | 8/2000 | Ziegler | ................. | F16L 59/065 138/114 |
| 8,561,677 B2 * | 10/2013 | Miyamura | ............ | F24F 5/0092 165/168 |
| 2004/0244321 A1 * | 12/2004 | Dincel | ................. | E04B 2/8629 52/503 |
| 2010/0218923 A1 * | 9/2010 | Kang | ...................... | F24D 3/127 165/170 |
| 2011/0042471 A1 * | 2/2011 | Futaeda | .................... | F24D 3/18 236/51 |
| 2013/0180191 A1 * | 7/2013 | Teron | ...................... | E04C 2/525 52/220.1 |

(Continued)

*Primary Examiner* — Joel M Attey

(57) ABSTRACT

In a first aspect, a system for heating, cooling, or both heating and cooling a room is disclosed. The system includes a panel with a first, second, and third wall. The second wall is disposed between the first and third walls and separated by a plurality of partitions. The partitions create a first and second row of elongated channels. Each channel in the first row is bounded on two sides by two partitions and on two other sides by the first and second walls. Each channel in the second row is bounded on two sides by two partitions and on two other sides by the second and third walls. The first row of channels is a fluid layer configured to allow heated or cooled fluid to pass through. The fluid layer is in thermal communication with the room. The second row of channels is an insulating vacuum layer, with a reduced pressure that is at least 20% less than atmospheric pressure.

15 Claims, 9 Drawing Sheets

(56) References Cited

U.S. PATENT DOCUMENTS

2014/0014302 A1* 1/2014 Gutai ................. F24D 3/12
                                                 165/104.19
2017/0291754 A1* 10/2017 Rotter ............. B65D 81/3823
2018/0202669 A1* 7/2018 Baratti ............. F24F 5/0089

* cited by examiner

SYSTEM FOR HEATING AND COOLING A ROOM WITH INSULATING LAYER

TECHNICAL FIELD

The present invention relates to radiant heating and cooling devices.

BACKGROUND

Various solutions exist for heating and cooling spaces. Heating can be provided to a complete building, such as a residence, by a furnace that heats air, e.g. by combustion of a gas, which heated air is blown through vents into the building. Also, a boiler can heat water, oil, or other fluids, which circulate through pipes or radiators to heat rooms with radiant heat. Alternatively, electrical heaters can convert electricity to heat. Similarly, cooling can be provided with forced central air, chilled fluids that are pumped through pipes or radiators, and local electrical air conditioners.

Typical radiant heating systems are often standalone units or are installed in floors. Sometimes, they are also installed in walls and ceilings. Some more recent radiant heating systems use PEX (cross-linked polyethylene) pipes or other types of pipes that are placed throughout the floor, wall, or ceiling, and water circulates through the pipes to either heat or cool the surrounding space. However, when the pipes in which the water circulates cover a small portion of the surface area where they are installed, such radiant heating systems may result in slow or uneven heating, especially when objects such as couches, bookshelves, pictures, or clocks are placed in front of or over the top of the system. Furthermore, such systems can be difficult to construct, install, or repair.

SUMMARY

In a first aspect, a system for heating, cooling, or both heating and cooling a room is disclosed. The system includes a panel with a first, second, and third wall. The second wall is disposed between the first and third walls and separated by a plurality of partitions. The partitions create a first and second row of elongated channels. Each channel in the first row is bounded on two sides by two partitions and on two other sides by the first and second walls. Each channel in the second row is bounded on two sides by two partitions and on two other sides by the second and third walls. The first row of channels is a fluid layer configured to allow heated or cooled fluid to pass through. The fluid layer is in thermal communication with the room. The second row of channels is an insulating vacuum layer, with a reduced pressure that is at least 20% less than atmospheric pressure.

In a second aspect, the system includes a panel of extruded plastic comprising a first and a second outer surface and a plurality of adjoined parallel channels disposed between the walls, the channels forming two distinct rows of channels between the walls. One row is a fluid layer and allows a fluid to pass through and the other row is an insulating vacuum layer configured to hold a vacuum which is less than 20% of atmospheric pressure. The system also includes a cooling system which cools the fluid and a pump to circulate the cooled fluid through the fluid layer to thereby cool the room.

In a third aspect, the system includes a panel made from plastic twinwall which has two distinct rows of channels. A first row of channels is a vacuum layer and has a pressure that is less than 10% of atmospheric pressure. A second row of channels is a fluid layer configured to allow fluid to pass through. The system further includes a check valve configured to allow air to be removed from the vacuum layer.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
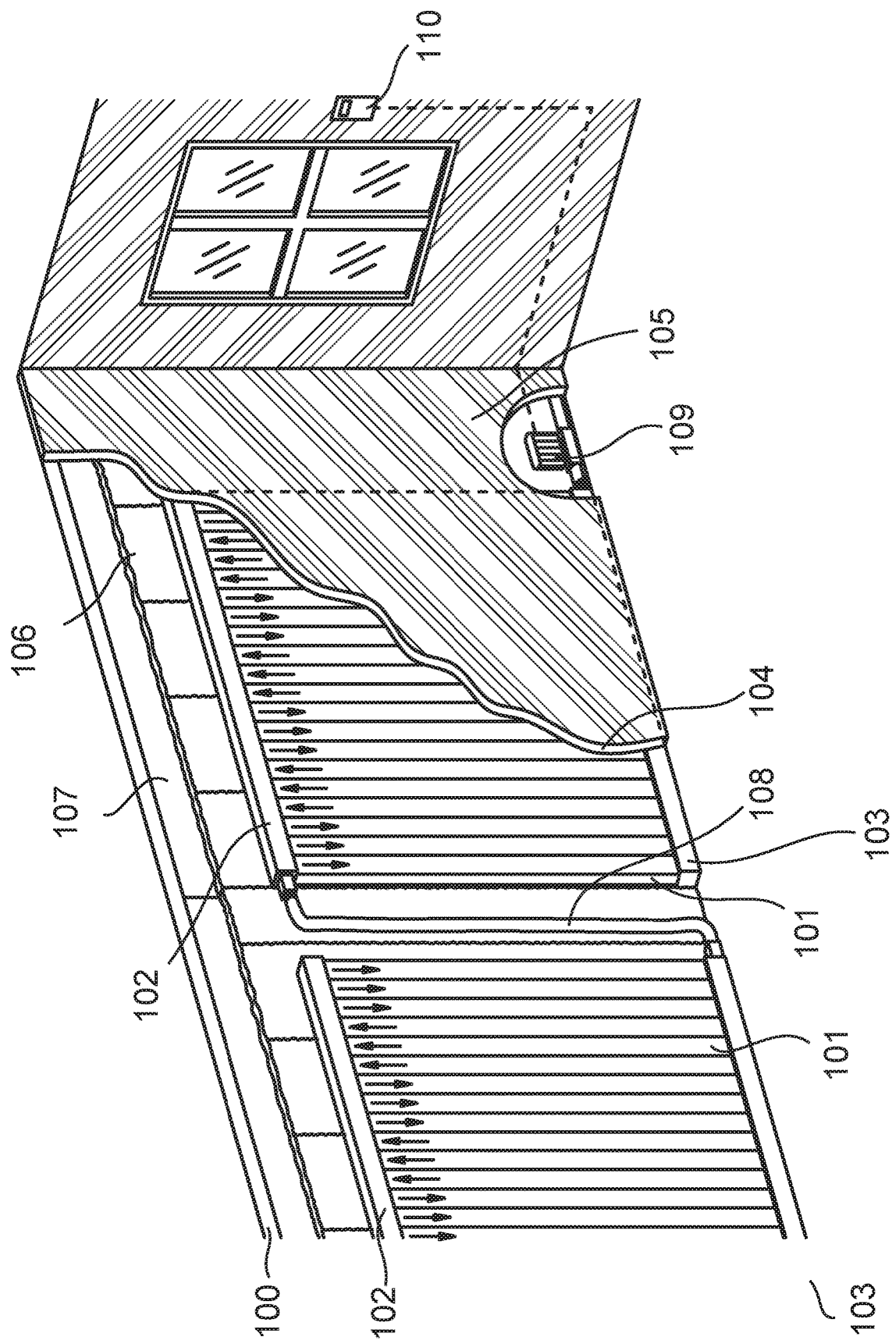
FIG. 1 is perspective view of a system for heating or cooling a room according to one embodiment of the invention including two panels and a thermostat.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "contiguous," as in "contiguous channels," is generally meant to refer to the channels being separated by a common wall, although the key feature is that the channels are adjacent to each other.

As used herein, "heated," as in "heated water," is meant to refer to water that is generally above the ambient temperature of the room.

Likewise, as used herein, "cold" or "cooled," as in "cold water" or "cooled water," is meant to refer to water that is generally below the ambient temperature of the room.

As used herein, "radiant area" is defined as the total cross-sectional area of the heated or cooled fluid in the plane parallel to the surface of the wall. For example, if an array of circular pipes containing heated fluid was in a wall, the radiant area would be total length of pipe in the wall, times its diameter. Radiant area does not include transport piping or area of fluid outside the room being heated or cooled.

As used herein, "exchange medium" means matter which is an energy sink or an energy source depending on the needs of the system. For example, an exchange medium could comprise earth, air, water, refrigerant, etc. "Exchange medium" only refers to mediums of forced exchange rather than downstream uncontrolled energy exchange.

As used herein, a "closed system" means a system of piping, channels, or other fluid containing tubular vessels which primarily reuses the same fluid rather than introducing new fluid during use of the system.

As used herein, "continuously-parallel circuit" is meant to refer to a circuit comprising two conductors disposed along opposite edges of a continuous resistor such that an increased length of the resistor adds to the resistance in parallel, or in other words, reduces the overall resistance.

As used herein, the term "panel" is to be given a relatively broad meaning, referring to a component that has a depth smaller than the height and width. Preferably, the panels in this invention are flat and rectangular. Nevertheless, the panels may also be curved, bent, and have shapes other than rectangles. Panel may refer to one portion of a prebuilt wall, or it may refer to one portion of a wall that is built from scratch in place, or it may refer to a free-standing component.

As used herein, "thermal communication" refers to the exchange of energy between components, whether it be by conduction, convection, or radiation.

As used herein, "electrothermal" refers to the generation of heat from electricity.

As used herein, the term "insulating" is intended to have a broad meaning, referring to thermal insulation as well as sound insulation.

As used herein, the term "vacuum" is intended to mean a space where air pressure is less than 20% of atmospheric air pressure.

Radiant heating, as opposed to convective heating, is popular due to its quiet nature and the fact that it does not spread allergens. It can also be more efficient than convective heating because it does not require heating up the air of the building before a user can feel the warmth. Similarly, radiant cooling, although not as popular as radiant heating, is a quiet, efficient, and nondisruptive way to cool a building. Radiant panels can be configured to run in a cooling mode when cooler temperatures are desired and a heating mode when warmer temperatures are desired.

Radiation is transferring electromagnetic energy in the form of infrared rays from one surface to the other surfaces around it. The amount of energy transferred depends on the both the temperature and area of the surface. A higher temperature and a larger surface area will increase heat transfer. Therefore, it is beneficial to increase the temperature and the surface area of a radiant heater. Or conversely, increasing the surface area can allow a radiant heater to operate at cooler temperatures, which may be useful when a source of heat is not hot enough to operate with a smaller surface area. It also can be safer. Similarly, a larger area for a radiative cooler can absorb more energy from the room as the objects in the room radiate to it, helping the room to cool down more quickly.

The present invention utilizes multiple channel layers configured to aid insulation, noise reduction, or reduce condensation by creating a vacuum in one or more of the layers. This is preferably made possible by using multiple sheets of extruded material which are placed adjacent to each other or a single panel of extruded material which has multiple channel layers within it. Channels of air make great insulators, but channels with a vacuum are better because there is no convection or conduction through an empty space. One embodiment of the invention has a single panel with three channel layers, as depicted in FIG. 5c. Cooled or heated fluid may run through the layer closest to the room to deliver heat to the room, and the middle or rear layer would have a vacuum. The third layer may also have a vacuum, or it could be filled with air or an insulator, such as barite, or it could be a second fluid-containing layer. In the preferred embodiment of this configuration, the vacuum layer is on the front and the fluid-containing layer is in the middle or back. This could drive radiation as the main heat transfer mechanism. In some cases, this may help with condensation on the front of the wall, especially during cooling. This is because the temperature of the front of the panel will be somewhere between the temperatures of the fluid layer and the room, especially if its temperature is closer to room temperature.

Preferably, the insulating vacuum layer is disposed between a wall of the room and the fluid layer. In this way, the transfer of heat or cool to the wall of the room is reduced. If desired, multiple vacuum layers can be placed between the fluid layer and the wall of the room to increase the insulating effect.

Alternatively, an insulating layer may be disposed between the fluid layer and the interior of the room. This design is possible because radiant heat can travel through a vacuum. Including an insulating layer on the exposed layer of the panel may be preferred in some embodiments, for example, to prevent the exposed surface of the panel from getting too warm or too cool. Keeping the exposed surface from getting too warm could be a safety, or least a comfort feature. Keeping the exposed surface from getting too cool could help prevent condensation on the surface in humid climates.

Typically, the insulating vacuum layer provides thermal insulation for the panel. In addition, the vacuum layer also serves to provide sound insulation to the panel. This can be especially beneficial when the panel is used in multi-family residences.

In one embodiment of the present invention, the area of a radiant heater or cooler is maximized by running heated or cooled fluid through a panel made primarily of channels for fluid. One example is an extruded plastic panel of rectangle channels commonly called "twinwall" or "plastic cardboard." The channels may be contiguous such that each channel shares a wall, or partition, with an adjacent channel. This way, most or all of the area of the panel is radiant area. This provides much more radiant area than a panel or wall with traditional pipes running through it. It also minimizes leaking and maintenance because fluid from a leaky channel may go into the adjacent channel. In some embodiments, the radiant area is preferably greater than 20% of the wall. Even more preferably, the radiant area is greater than 50% of the wall. Even more preferably, the radiant area is more than 90% of the wall. The greater the radiant area is, the smaller the heat differential between the heating or cooling fluid and the room needs to be.

The fluid used in the system to transfer energy into or out of the room could be any fluid that is not harmful to the system, including gases or liquids. Liquids, such as water, have many ideal characteristics, such as high emissivity, high specific heat, and low cost. However, water tends to allow growth of organisms and has the potential of freezing. Glycols, such as ethylene glycol or propylene glycol, are commonly added to water to lower the freezing point and prevent growth of organisms. However, glycol reduces the specific heat of the mixture, so more volume is required through the system than with water alone. There are many glycols which share similar physical properties and are suitable for use in the invention, but the preferred embodiment typically uses propylene glycol because it is non-toxic and safer if there is a leak or spill. Preferably, the fluid is a water mixture with 20% to 45% glycol. Even more preferably, the fluid is a water mixture with 25% to 40% glycol. Even more preferably, the fluid is a water mixture with 30% to 32% glycol. In other embodiments, the fluid contains oil, such as diathermic oil, which has the additional benefit of remaining a liquid at higher temperatures than water.

One benefit of the present invention is that fluid may pass through the panel in a plurality of ways. In one embodiment, the fluid may flow up one channel and down the next, repeating through the channels from one side of the panel to the other. In another embodiment, the channels may be grouped into zones wherein the fluid passes up two or more channels, and then down two or more channels, repeating through the channels from one side of the panel to the other in a serpentine fashion. Additionally, the fluid may travel the same way through all the channels, such as from top to bottom. In yet another embodiment of the invention, the fluid passes from one side to the other side through any configuration of channels, but then returns to the first side typically through a top or bottom channel. In that embodiment the fluid may never leave the panel, but will cycle through it. In others, the fluid enters the panel through an inlet and exits through an outlet where it is directed to another part of the heating or cooling process.

The panel may be divided into zones in many ways. In one embodiment of the invention, one or more channels may have a notch or carveout of a section of a partition dividing it from another channel which puts two channels in fluid communication with each other. Many channels can be formed into a zone with neighboring carved-out partitions between channels. See FIG. 6 below for an example of carved-out partitions. Another way is with an endcap placed over an open end of a panel that puts some channels in communication with each other while blocking off others. In that configuration, there may be an opposing and corresponding endcap configured to provide the same zones as depicted in FIG. 7.

To prevent fluid from leaving the panel, some embodiments of the invention include an endcap. The endcap covers an open end of the channel. In some embodiments, the endcap is configured to redirect fluid from one channel or zone into another channel or zone. In one embodiment, the endcap is a manifold which distributes the fluid into more than one channels or zones.

The invention may also comprise an open or closed type system. In one embodiment, the fluid is in a closed system, wherein fluid is not added to the system except to replace fluid lost during maintenance or leaks. In another embodiment, the fluid is in an open system, wherein fluid is constantly added and disposed of during operation, such as fluid from a domestic water supply, secondary water supply, or an aquifer.

In one embodiment, the fluid is in communication with a heat pump. The heat pump exchanges energy between the fluid and an exchange medium, typically a compressible fluid capable of conducting heat such as a refrigerant. In some embodiments, that exchange medium is configured to transfer energy to another exchange medium, such as the air around a heat pump, or the earth around geothermal piping. In other embodiments, there is an additional exchange medium, such as when energy is transferred from the fluid to a refrigerant and from the refrigerant to an antifreeze all within a heat pump, and then that antifreeze is then pumped into geothermal piping where energy is finally exchanged with subterranean earth. In some embodiments, a heat pump is on the exterior of a building, which helps separate the exchange medium from the heated or cooled room, especially if the exchange medium is air. A heat pump on an exterior of a building has the added flexibility of being able to be plugged in to an internal or external outlet.

The invention also provides flexible installation options, including covering options. In one embodiment, the panel includes a finishable surface, such the fibrous surface of drywall. In other embodiments, the panel includes a decorative surface, such as a wallpaper or a painted surface. All of such options will help to make the panel's appearance unnoticeable. In other embodiments, it has a no covering or only a thin decorative covering to reduce the amount of heat absorbed by the wall. A thin decorative covering may be traditional paint, wallpaper, or canvas, which itself may have a painted or printed image. The decorative covering preferably also has a has a low thermal conductivity but a high emissivity, such as a velvet wallpapers or dull lacquers, which have emissivities of 0.97 or more, in order to make the wall cooler to the touch while still warming the room through radiation.

As noted above, in other embodiments, the panel has a layer of insulation, typically on the back side, either to reduce heat transfer through the wall or to reduce noise, or both. Insulation could be traditional fiberglass or foamboard, or it could comprise a second channel layer configured to insulate. In one embodiment, one or more additional channel layers, preferably made of twinwall, may be used and is filled with sound damping material such as soil or barite. In other embodiments, additional channel layers may be used with a layer of air to discourage sound vibrations and heat transfer.

The invention can be versatilely installed into the structure of a home. It can simply replace drywall and be supported by a support structure, such as wooden studs, or it can comprise a structural layer, such as a layer of sheet metal, and support the building. In one embodiment of the invention, a single panel is installed in a room. In other embodiments, more than one panel can be connected with fluid communication between the panels, which will increase the radiant area. In yet other embodiments, the panels make up the majority or the entire wall structure of the home. In yet other embodiments, the panels are configured to be retrofit into established buildings.

In addition to being installed into the structure of the home, the panels may be prefabricated-standalone panels. In one embodiment, the panel is fixed to the outside of a preexisting wall, but in others it supports itself either by leaning against a wall or with its own support structure, or hung like a decorative item. The prefabricated wall may be entirely mobile, such that it contains its own heating or cooling source, or it may connect to the home's preexisting heating or cooling systems such as HVAC, air conditioning, or radiative piping.

In an embodiment of the invention, the water is heated within the wall. The fluid may stay in the panel rather than be pumped to a remote heater. A resistive heater may be located either within a channel or near the panel such that it can heat the fluid either conductively, convectively, or radiatively, or by a combination thereof. In a preferred embodiment of the invention, a resistive heater is disposed within a channel layer, such as an elongated resistive heating element. In another embodiment, the heater may be outside the panel and configured to heat the fluid through the panel wall. One example is a sheet of heating material, which may be configured to lay flat against a side of the panel.

The invention may also be configured in a way that provides cooling utilizing the fluid and channel layer but heating with a separate heater that does not use the fluid. This may be needed when a home has access to cooled water, such as from an aquifer or secondary water, but no way to heat it. In one embodiment of the invention, the panel is connected to a source of cooled water for when it is in cooling mode and has a separate heating layer configured to heat the room when it is in heating mode.

One embodiment of this aspect of the invention comprises a heating layer that has an elongated resistor or series of resistors that weave back and forth or in a fashion that mimics a solid or near solid sheet. In another embodiment of the invention, the heating layer comprises a continuous sheet of resistive material with electrical conductors along both sides of the material, which puts the resistive material in a continuously-parallel circuit. One example is defined in US patent publication 2016/0185983 A1, which is hereby incorporated into this application. A continuously-parallel circuit has the benefit of adding additional length of resistive material in parallel rather than in series, which allows more flexibility for sizing the heater for different applications.

Another embodiment of the invention uses a reflective layer disposed within the panel to help direct heat transfer in a particular direction. Materials with very low emissivity (ability to radiate energy), such as aluminum, brass, chromium, or silver, among others, may be placed on the back side of the panel in order to reduce radiation into the wall. In the preferred embodiment, a reflective layer will have an emissivity lower than 0.1 and be economically sourced, such as aluminum foil with an emissivity of 0.04.

Now referring to FIG. 1, one embodiment of a radiant heating and cooling system is shown 100. A panel 101 comprises a layer of contiguous channels, which are filled with a fluid which can be heated and cooled. The channels may be configured into zones such that fluid travels the same direction through each zone rather than alternating each adjacent channel. In the depicted embodiment, fluid is supplied to three channels through an upper manifold 102, and then redirected into the next three channels through a lower manifold 103. The upper manifold 102 and lower manifold 103 also serve to redirect the fluid through the rest of panel, where it finally exits the panel through the lower manifold 103.

In the depicted embodiment, the panel 101 is covered with a sheet of drywall 104, which is covered with a layer of wallpaper, 105. Insulation 106 is placed behind the panel 101 in order to prevent heat loss into the wall. A layer of low-emissive material, such as foil 107, is placed behind the insulation 106 to prevent radiation through the back side of the wall.

The embodiment of FIG. 1 shows two panels in series, wherein interconnected piping 108 puts the two panels in fluid communication. A pump 109 forces fluid either to or from the panels. In the depicted embodiment, the pump is actuated by a thermostat 110. In this embodiment but not shown in FIG. 1, the piping would also connect to a heater or a cooler or both.

Figure 2:
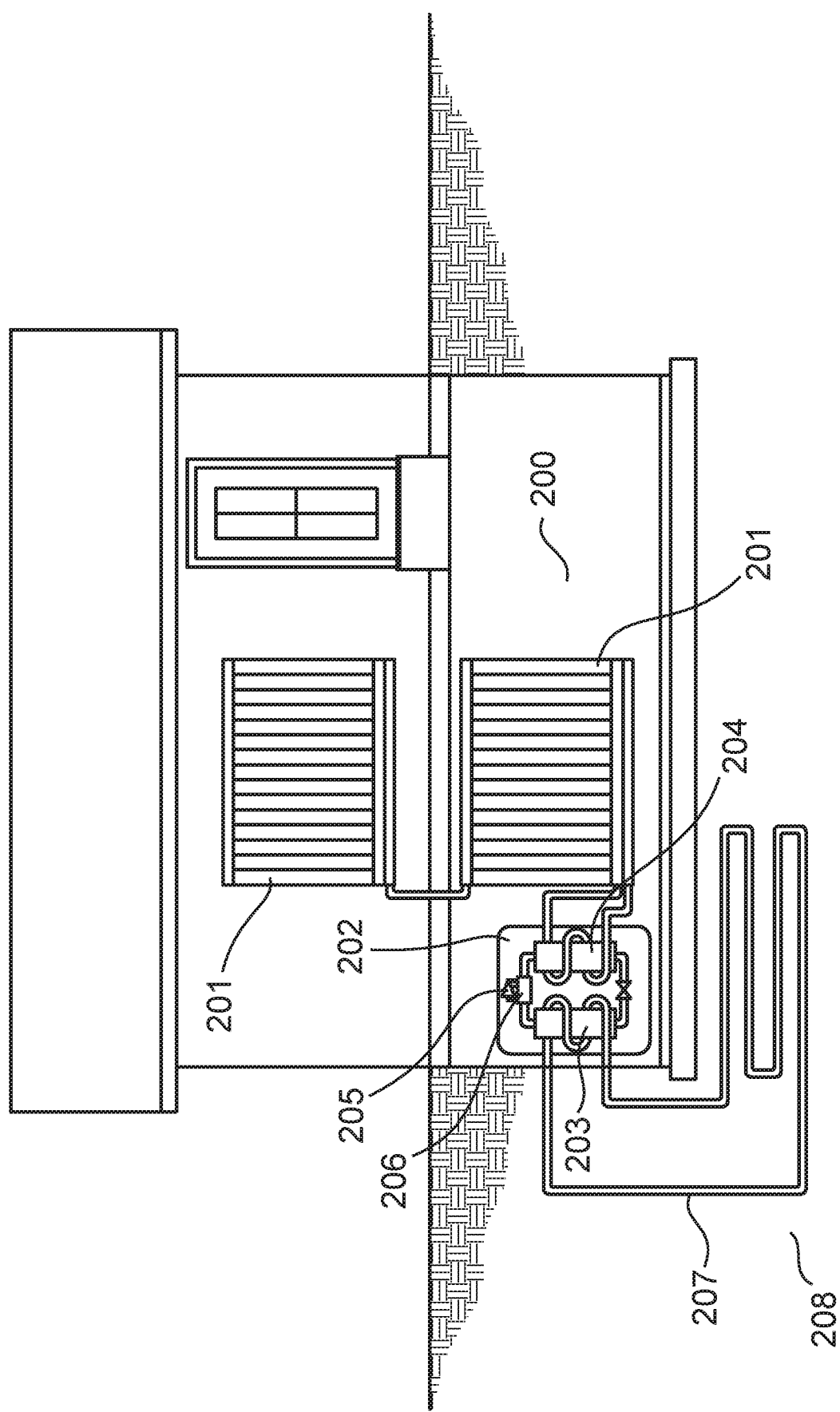
FIG. 2 is a front elevation view of a system for heating or cooling a room according to another embodiment of the invention including a geothermal heat pump.

Now referring to FIG. 2, a radiant heating and cooling system 200 is shown. A radiant panel containing fluid 201 is disposed inside of a room. The panel is in fluid communication with a heat pump 202. The heat pump comprises an evaporator 203 and a condenser 204, both of which can act as either an evaporator or a condenser depending on whether the system is cooling or heating the house. The heat pump also comprises a compressor 205 and a reversing valve 206. Geothermal piping 207 is in thermal communication with both the heat pump 202 and subterranean earth 208. In heating mode, a fluid in the geothermal piping 207 absorbs heat from the earth, which is then exchanged to the fluid of the radiant panel 201 through the heat pump 202. In cooling mode, the heat pump 202 exchanges energy from the fluid of the radiant panel 201 to the fluid of the geothermal piping 207. It uses the subterranean earth 208 as a heat sink to absorb that energy before returning to the heat pump 202 to receive more heat. In the depicted embodiment, the heat pump 202 uses an indirect exchange geothermal system, which means a refrigerant is an intermediary between the fluid of the radiant panel and the fluid of the geothermal piping and transfers heat between the two systems of piping. In that embodiment, the fluid in the geothermal piping may be an antifreeze such as glycol, methanol, water, a mixture thereof, or other. In another embodiment, such as a direct exchange geothermal system, there is no intermediary fluid. In that embodiment, a refrigerant is typically piped through the heat pump and then directly into the ground to exchange heat with the subterranean earth.

Figure 3:
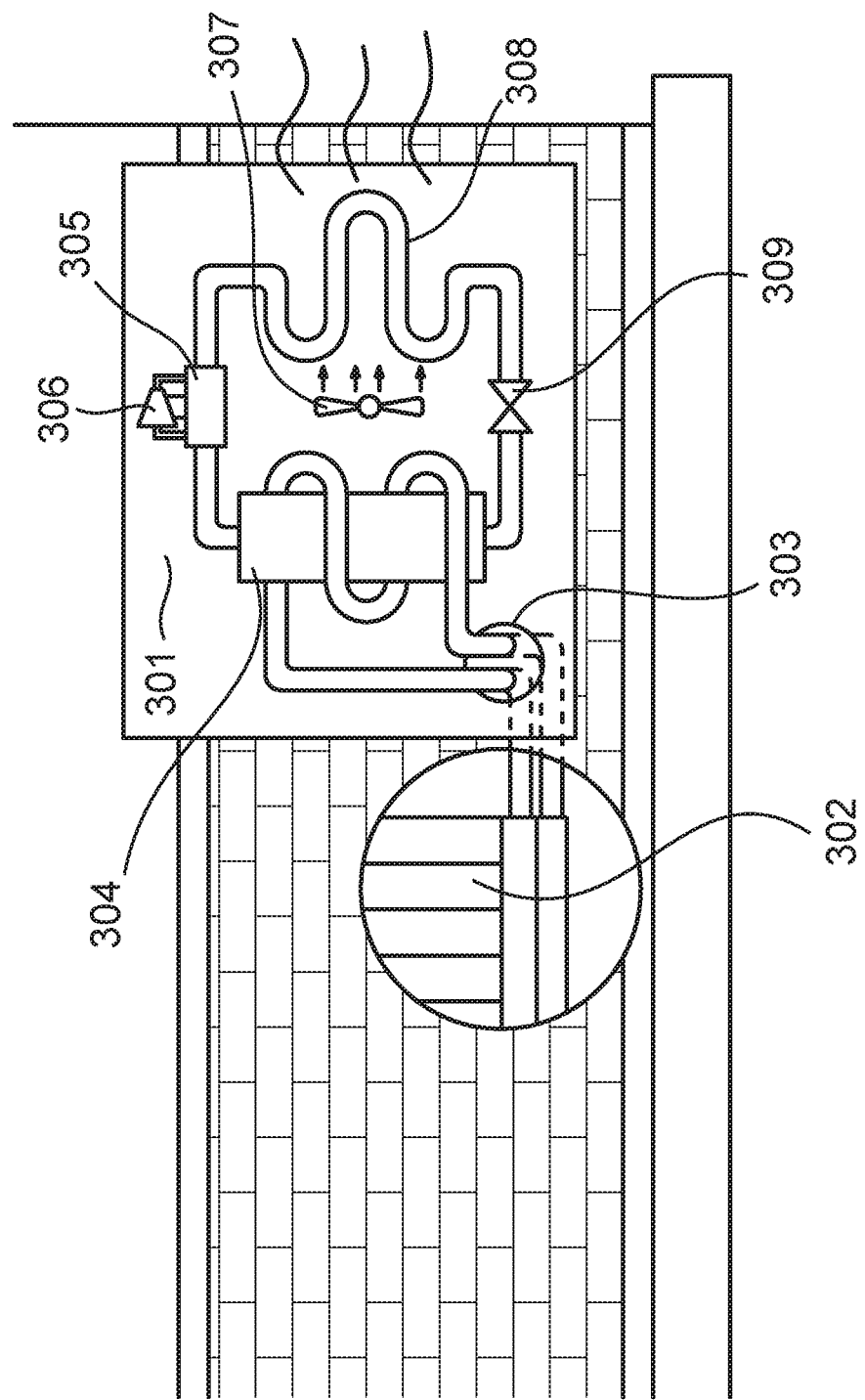
FIG. 3 is a rear elevation view of another embodiment of the invention including an air heat pump on the outside wall of a radiant panel.

Now referring to FIG. 3, which is one embodiment of the invention wherein a heat pump 301 is outside of a room with a radiant panel 302. This embodiment is configured to simplify piping between the radiant panel 302 and the heat pump 301, with only one or a few small holes in the building 303. The fluid in the radiant panel exchanges energy with the heat pump through a heat exchanger 304. The heat exchanger 304 may be a condenser or an evaporator depending on whether the system is heating or cooling the room. The heat pump also contains a reversing valve 305 and a compressor 306. A fan 307 blows air over another heat exchanger 308, which also may be a condenser or an evaporator depending on the mode of the system. The system also contains an expansion valve 309, which cools the refrigerant by expanding it.

Figure 4:
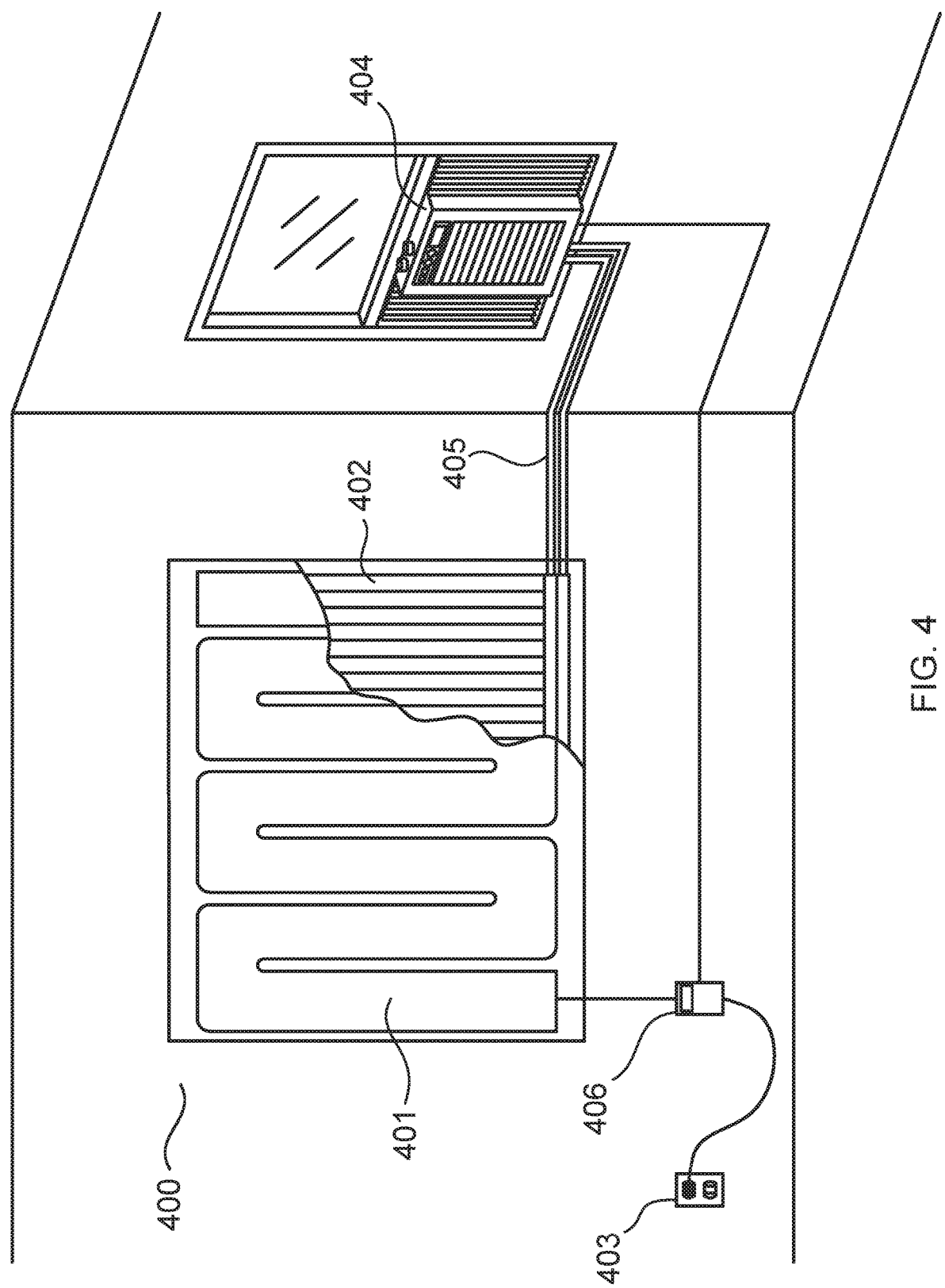
FIG. 4 is a perspective view of a system for heating or cooling a room including an electric heater and a chiller.

Now referring to FIG. 4, which is an embodiment of the invention that includes a separate heating layer. This may be useful in situations where a cold water source is available, or when electricity is more economical or available than other heating sources. In this embodiment, a radiant heating and cooling system 400 includes a heater 401 and a cooling panel 402. The heater 401 is powered by an outlet 403. This heater includes electrothermal material in a continuously-parallel circuit, but other embodiments of the invention may include other types of electrothermal resistors and circuits. In the depicted embodiment, the heating layer is on the front side of the channel layer, however, in other embodiments the channel layer is on the front.

The depicted embodiment shows a chiller 404, but cooled water supply may be other sources such as an aquifer, secondary water, geothermal piping, or other. Here, the chiller is in fluid communication with the channel layer through two interconnecting pipes 405.

In the preferred embodiment, the chiller and heater are controlled by a thermostat 406. The thermostat 406 can be programmed to turn on the chiller when it senses the room is above a predetermined temperature, and turn on the heater when it senses the room is below a predetermined temperature. In other embodiments, the chiller and the heater have manual switches or have separate thermostats.

Figure 5A:
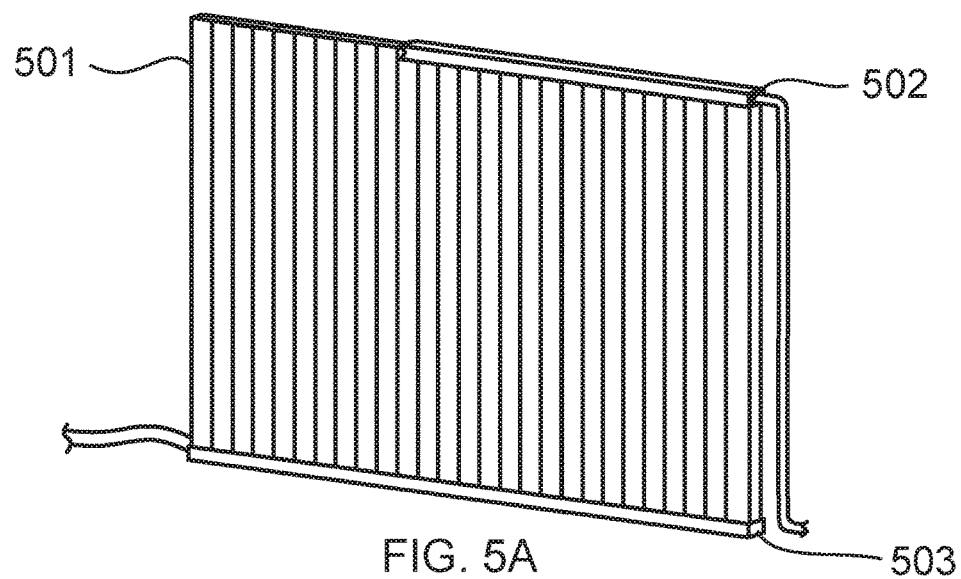
FIGS. 5a-5c are perspective views of embodiments of the invention using various layers of channels.
Figure 5B:
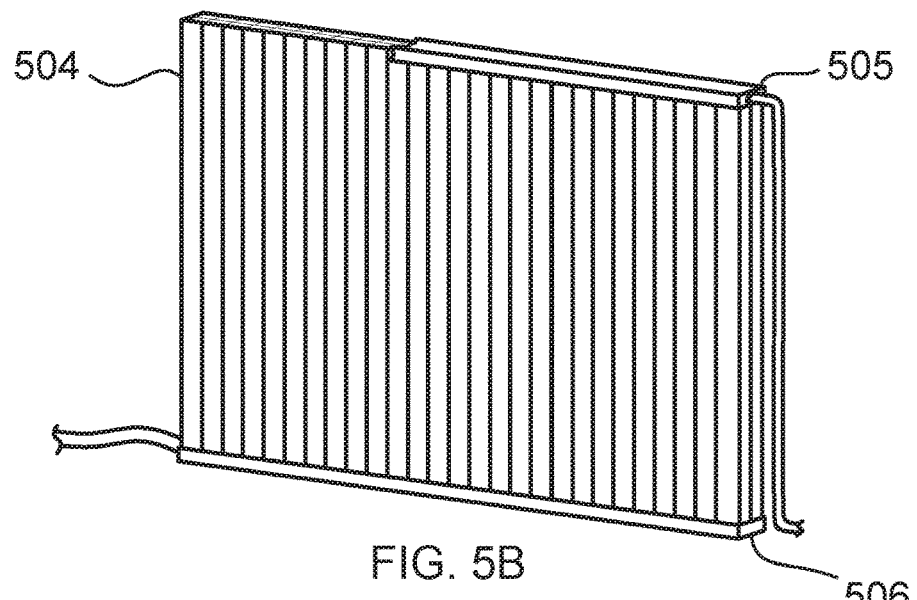
Figure 5C:
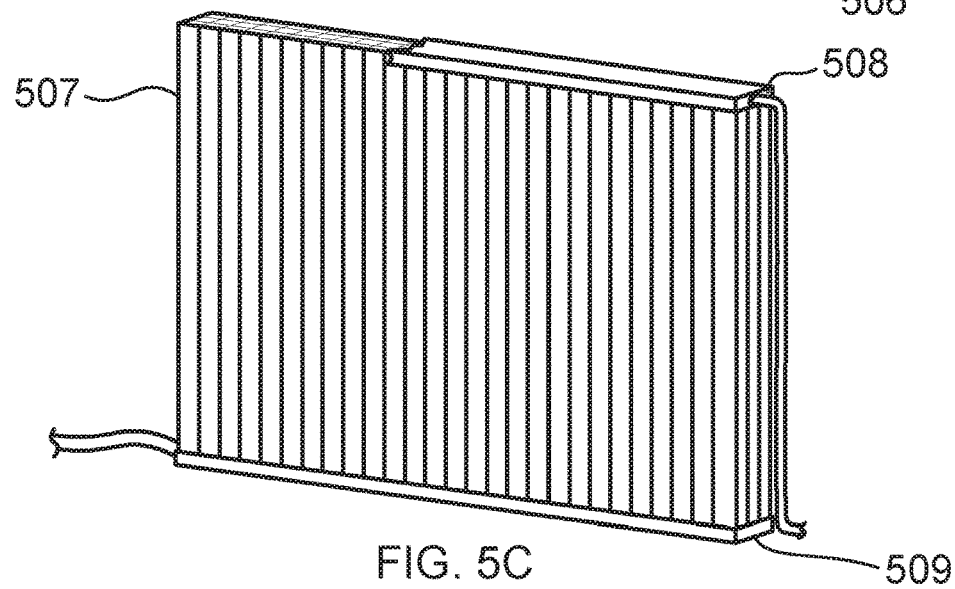

Now referring to FIG. 5, which shows multiple embodiments of the invention. FIG. 5A shows a radiant panel with a single row of channels 501. Endcaps 502 and 503 keep fluid from escaping the panel. FIG. 5B shows a radiant panel with two rows of channels 504. Endcaps 505 and 506 keep fluid from escaping the panel. FIG. 5C shows a radiant panel with three rows of channels 507. Endcaps 508 and 509 keep fluid from escaping the panel.

Figure 6:
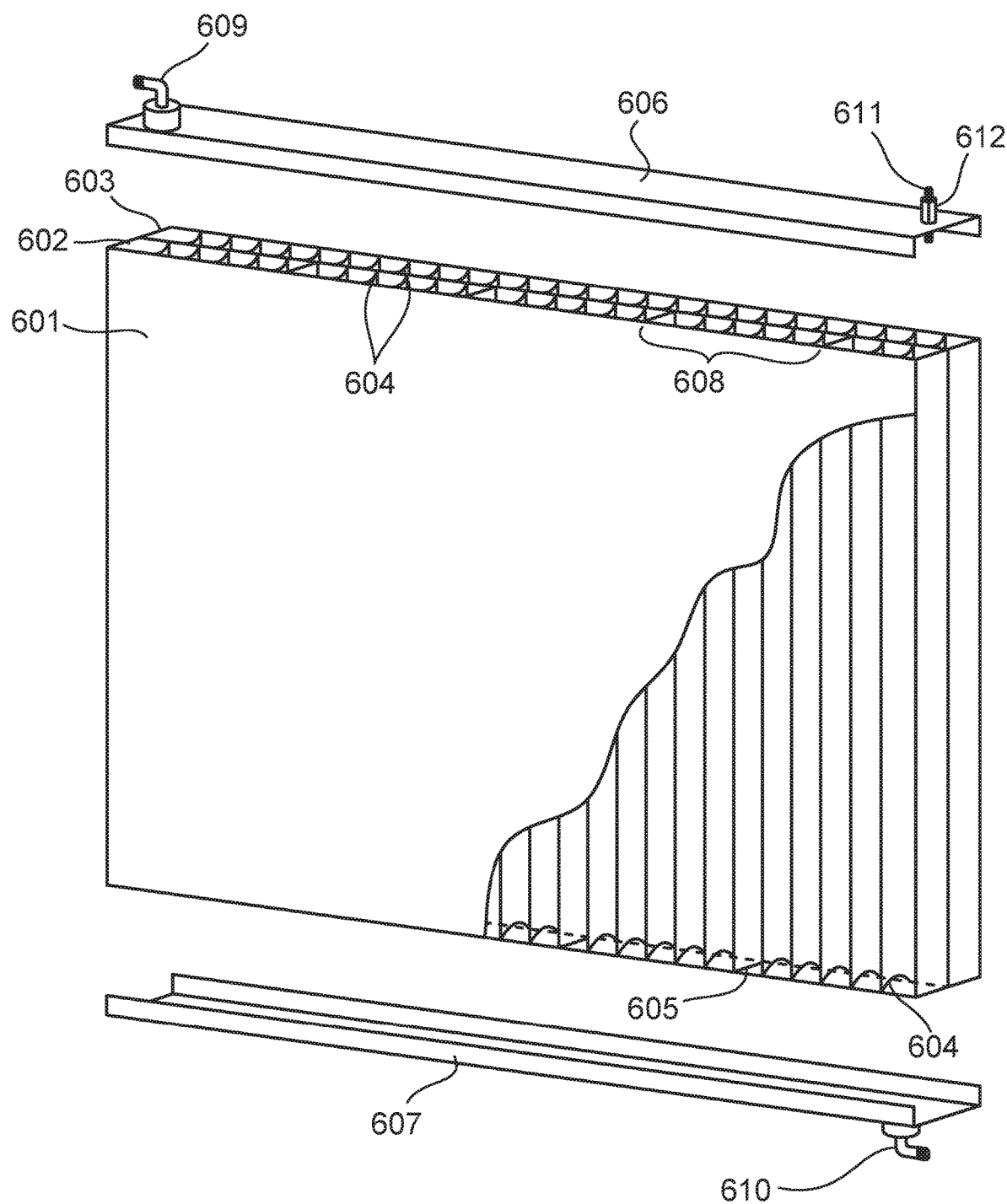
FIG. 6 is a perspective view of one embodiment of the invention including a vacuum layer.
Figure 7:
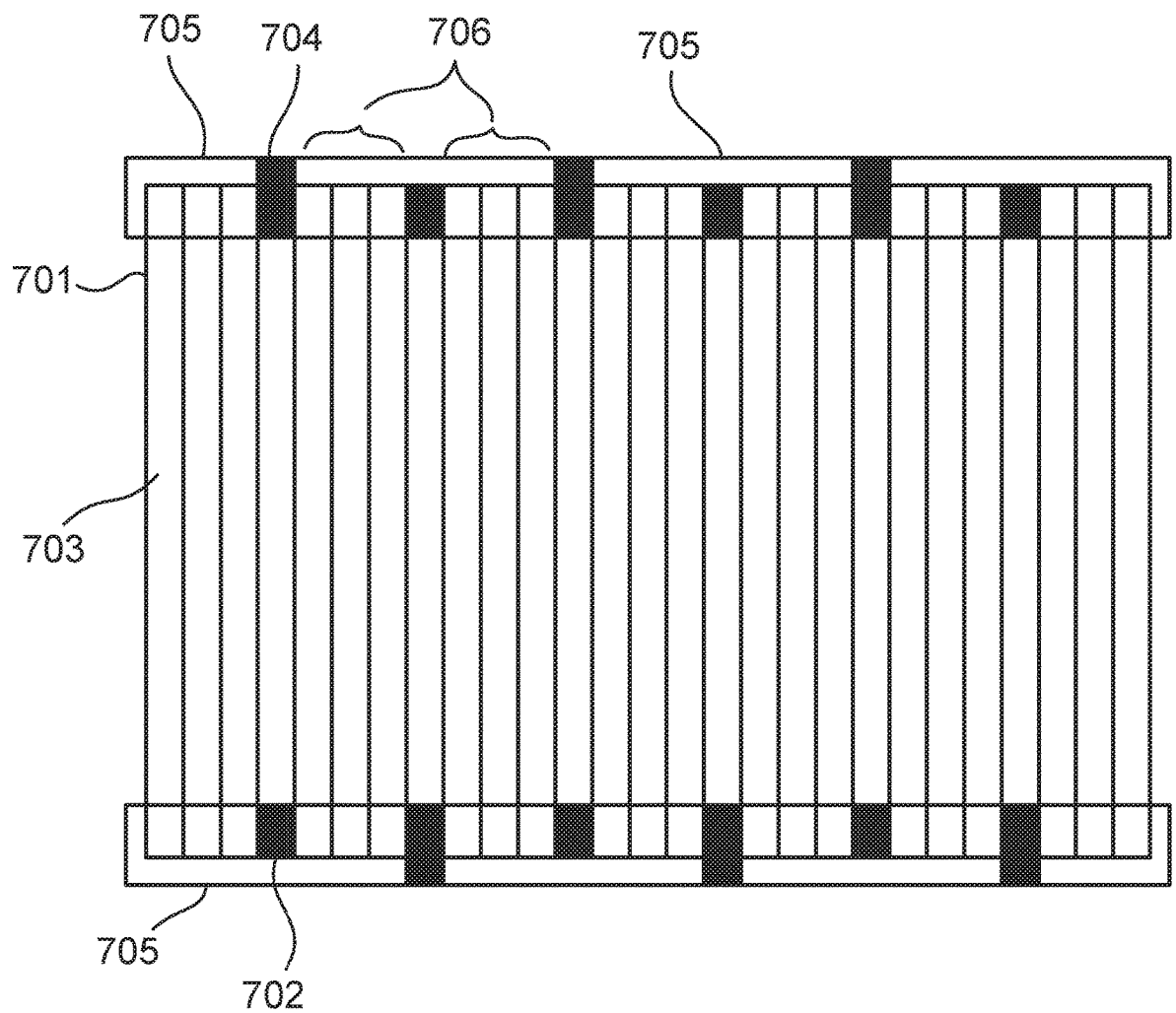
FIG. 7 is a front view of one embodiment of the invention wherein the channels are grouped into zones with the use of plugs.

Now referring to FIG. 6, which shows an embodiment of the invention with a vacuum layer. A radiant panel 601 has two rows of channels, each comprising a different layers of the panel: a fluid layer 602 and a vacuum layer 603. Some of the partitions of the fluid layer have a notch 604 allowing fluid to flow between them, while others extend to the end of the channel 605 to form a barrier between the partition and the endcaps 606 and 607. This allows a fluid to flow in the same direction through multiple channels, or zones 608. In this embodiment, the vacuum layer does not have any zones. A fluid inlet 609 and outlet 610 are on the endcaps and allow fluid to enter and exit the fluid layer. A vacuum nozzle 611 with check valve 612 is mounted on endcap 606 on the side of the vacuum layer, which allows air to be removed from the vacuum layer without reentering.

Now referring to FIG. 7, which shows one embodiment of the invention using plugs to create zones. A radiant panel 701 is shown in a serpentine configuration. Smaller plugs 702 prevent fluid from entering a channel 703, while larger plugs 704 prevent fluid from entering a channel and also passing through the endcaps 705. Zones 706 are created, in this case, each with three channels. The small and large plugs are offset such that fluid flows from side to side in a serpentine configuration through the panel. In this configuration, the endcaps 705 create manifold areas 706 that redirect the fluid back into the channels in contrast to FIG. 6, which uses notches within the channels to do this.

Figure 8:
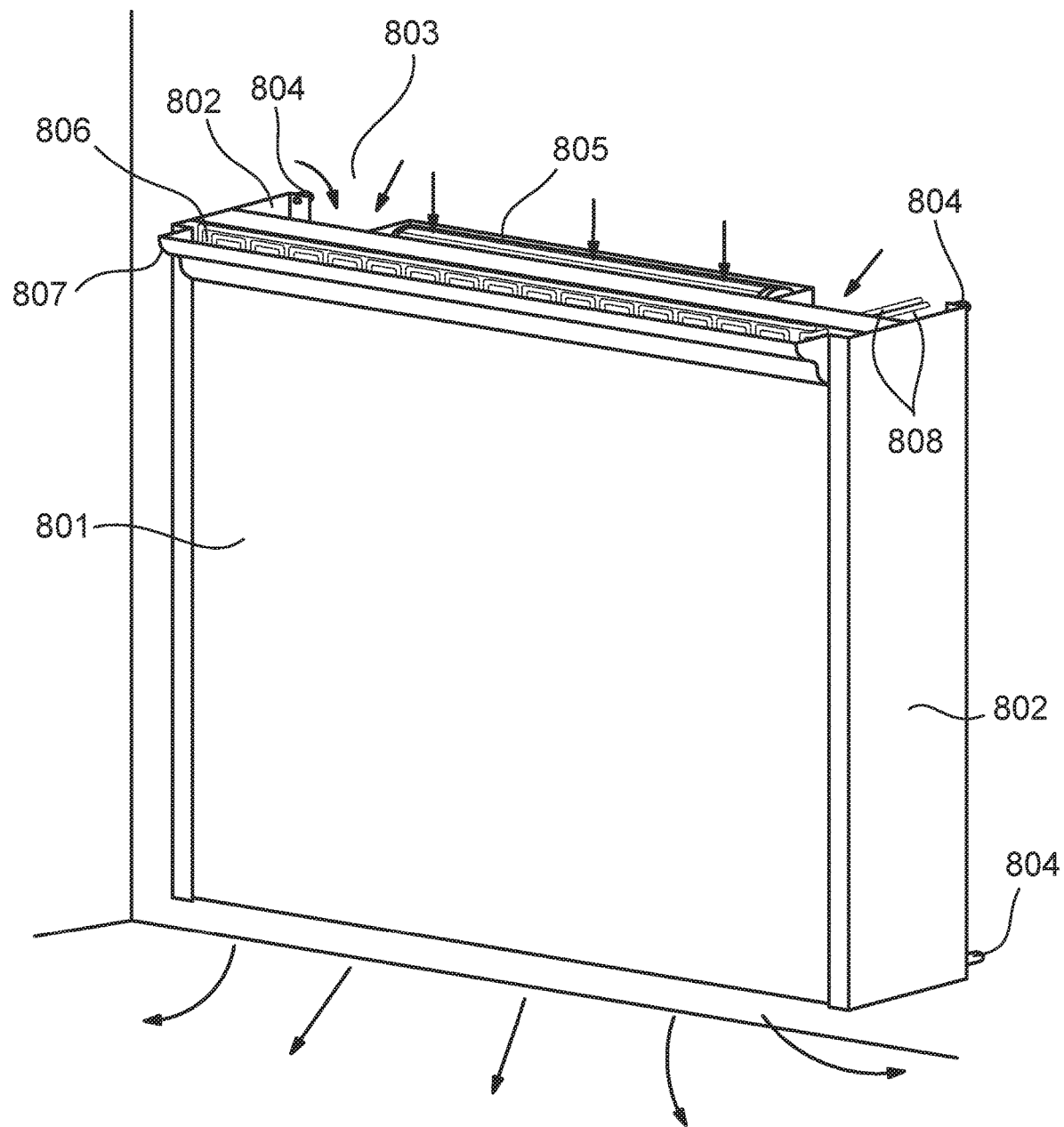
FIG. 8 is a perspective view of one embodiment of the invention including spacing elements.

Now referring to FIG. 8, a heating or cooling system is depicted with a gap between a panel and a wall to allow airflow. A radiant panel 801 is attached to a wall with two mounting brackets 802. The mounting brackets 802 are also spacers which create an airchannel 803 between the wall and the panel 801. The system further includes sound damping spacers 804 to reduce sound propagation to or from the wall. A fan 805 may help air flow and energy transfer to or from the room as well as help remove condensation from the panel. In the preferred embodiment, the fan is a low rpm squirrel-cage fan, however, other fans such as propeller fans may also be used.

FIG. 8 also depicts a heat exchange chamber 806, which is hidden by a decorative crown molding 807. Within the heat exchange chamber 806, pipes 808 connecting to a heating or cooling system (not shown) are in thermal communication with the fluid of the radiant panel 801 within the heat exchange chamber 806.

Figure 9:
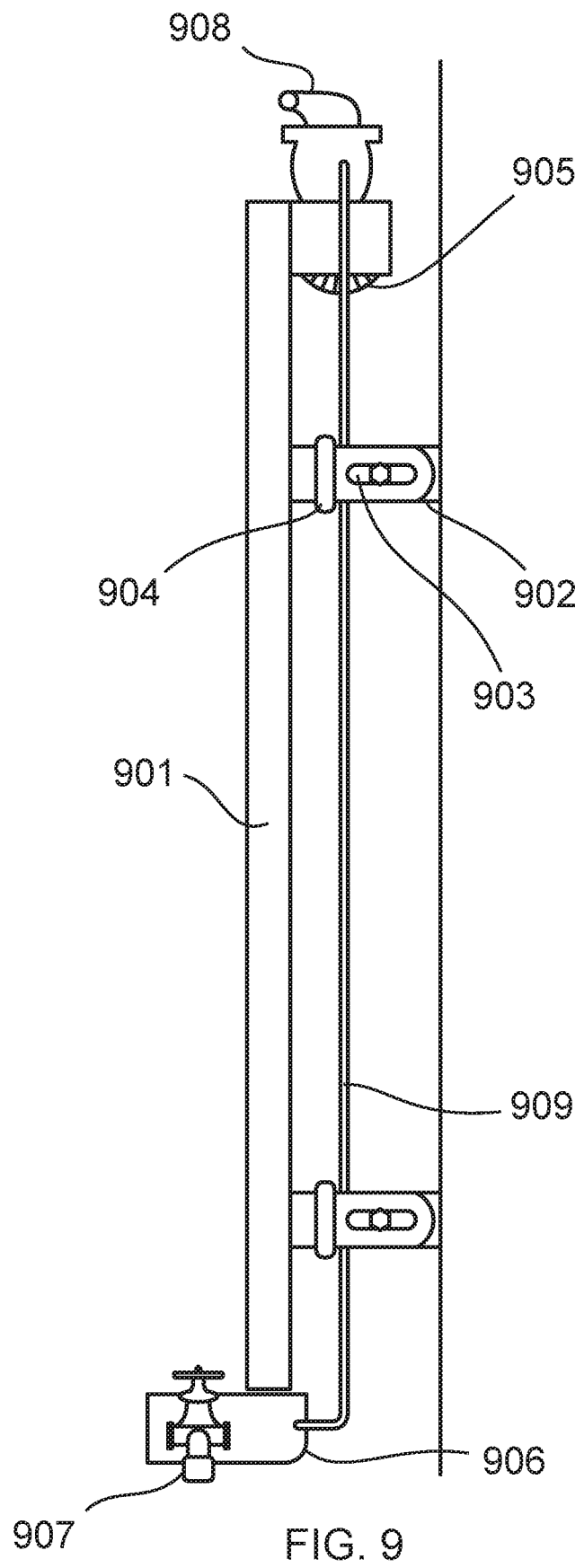
FIG. 9 is a side view of another embodiment of the invention including spacing elements.

FIG. 9 shows another embodiment of the invention with spacers, which allow the panel to be offset from a wall. A radiant panel 901 is attached to a wall with spacers 902 with adjustable slots 903. The spacers 902 also include a sound damping rubber portion 904 to reduce sound propagation to or from the wall. A fan 905 may help air flow and energy transfer to or from the room as well as help remove condensation from the panel.

FIG. 9 further includes a condensation catching and returning system. A basin 906 is attached to the bottom of the system to catch condensation that drips down the panel 901. A spout 907 allows water to be removed from the basin 906. An additional method of draining the basin is with a humidifier 908. The humidifier is typically an ultrasonic or impeller type for cooling applications and a steam vaporizer for heating applications, although it may be any type that returns the condensation to the air. A water line 909 connects the basin 906 to the humidifier 908. The humidifier 908 has an additional supply line of water (not shown) in case humidity is desired when the basin 906 is empty.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A system for heating, cooling, or both heating and cooling a room comprising:
   a panel comprising:
      a first wall,
      a second wall, and
      a third wall,
      wherein the second wall is disposed between the first wall and third wall and the second wall is separated by a plurality of partitions from the first wall and from the third wall,
      wherein the partitions create a first and second row of elongated channels, wherein each channel in the first row is bounded on two sides by two of the plurality of partitions and on two other sides by the first and second walls, and
      wherein each channel in the second row is bounded on two sides by two of the plurality of partitions and on two other sides by the second and third walls;
   wherein the first row of channels is a fluid layer configured to allow heated or cooled fluid to pass through in a serpentine fashion, the fluid layer being in thermal communication with the room; and
   wherein the second row of channels is an insulating vacuum layer, with a reduced pressure that is at least 20% less than atmospheric pressure.

2. The system of claim 1 further comprising
   a first end cap disposed on one end of the first row of channels and configured to prevent fluid from escaping the panel except through an inlet or an outlet; and a second end cap disposed on an other end of the first row of channels and configured to prevent fluid from escaping the panel except through the inlet or the outlet.

3. The system of claim 2 further comprising a gap in one or more partitions, wherein the gap allows fluid to pass from one chamber into an adjacent chamber.

4. The system of claim 2 wherein the first and second end caps are configured to direct fluid from one channel to another.

5. The system of claim 2 wherein the first and second end caps close the channels in the insulative vacuum layer and are configured to maintain the reduced pressure.

6. The system of claim 5, wherein the first end cap comprises a port with a check valve, whereby air can be pulled out of the insulating vacuum layer to create, maintain or increase the reduced pressure.

7. The system of claim 1 wherein the reduced pressure is less than 10% of atmospheric pressure.

8. The system of claim 1 wherein the reduced pressure is less than 5% of atmospheric pressure.

9. The system of claim 1 wherein the insulating vacuum layer is disposed between a wall of the room and the fluid layer.

10. The system of claim 1 wherein the fluid layer is disposed between a wall of the room and the insulating vacuum layer.

11. The system of claim 1 wherein the insulating vacuum layer is a first insulating vacuum layer and further comprising a fourth wall adjacent to the third wall and separated by partitions to create a third row of elongated channels wherein the third row of channels is a second insulating vacuum layer adjacent the first insulating vacuum layer and with a second reduced pressure that is at least 20% less than atmospheric pressure.

12. The system of claim 1 wherein the insulating vacuum layer is a first insulating vacuum layer and further comprising a fourth wall adjacent to the first wall and separated by partitions to create a third row of elongated channels wherein the third row of channels is a second insulating vacuum layer adjacent the fluid layer and with a second reduced pressure that is at least 20% less than atmospheric pressure.

13. The system of claim 1 wherein the panel is made from extruded plastic.

14. The system of claim 1 wherein the panel is made from aluminum.

15. The system of claim 1 further comprising a coating on at least one wall; wherein the coating comprises a coating with an emissivity greater than 0.97.

* * * * *